Figure 1:
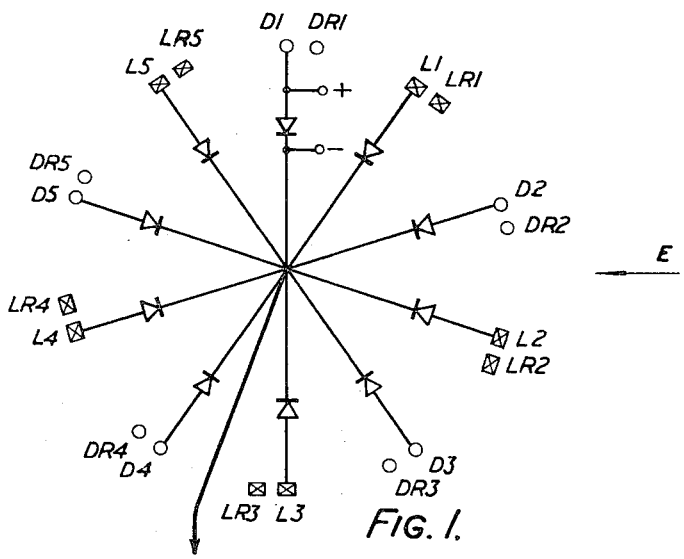

July 31, 1962   D. BYATT   3,047,864
RADIO DIRECTION FINDING SYSTEMS
Filed Aug. 10, 1959   3 Sheets-Sheet 1

INVENTOR:
Dennis Byatt,
BY
Baldwin & Wight
ATTORNEYS

United States Patent Office 3,047,864
Patented July 31, 1962

3,047,864
RADIO DIRECTION FINDING SYSTEMS
Dennis Byatt, Essex, England, assignor to Marconi's Wireless Telegraph Company Limited, London, England, a British company
Filed Aug. 10, 1959, Ser. No. 832,514
Claims priority, application Great Britain Sept. 9, 1958
7 Claims. (Cl. 343—120)

This invention relates to radio direction finding systems and more particularly to such systems wherein the output signals from a plurality of spaced aerial systems are successively sampled and the samples combined to form a composite signal whose characteristics are indicative of the direction of arrival of the received wave.

Much difficulty has been experienced in practice on obtaining accurate and steady bearings of the source of received waves in known direction finding systems under certain conditions. There are three main causes of such inaccuracy and fluctuations of bearings, namely (a) non-uniformity of the received wave front due to multiple reflections from the ionosphere; (b) non-uniformity of the received wave front due to reflections of the wave from objects close to the direction finding aerial system; (c) a steady or fluctuating difference between the plane of polarisation of the received wave and the plane of polarisation to which the aerial system is maximally responsive. The last case may be particularly serious where an elevated direction finding aerial system is employed, due to the interference between the direct wave and the ground reflected wave, which can in some cases cause almost total cancellation of the signal component in a desired plane of polarisation.

It is the object of the present invention to provide improved direction finders which will give comparatively accurate and steady bearing information and which will at the same time be of relatively simple and economical construction.

It is known to reduce inaccuracies and lack of reliability due to causes (a) and (b) above by employing an aerial system having a wide aperture so that the effect of non-uniformities in the wave front are considerably reduced but, even when this is done, difficulties due to cause (c) above still remain.

In the following parts of the specification and in the claims the term "aerial" is used in a broad sense to include an aerial system e.g. an aerial proper and an associated reflector aerial together constitute an aerial within the meaning of this specification. According to this invention a radio direction finder includes a first set of aerials of one plane of polarisation, the aerials of this set being angularly spaced around a centre point; a second set of aerials having a plane of polarisation substantially different from that of the first set, the aerials of said second set being also angularly spaced round said centre point and interspersed with the aerials of the first set; means for cyclicly and in turn sampling the signals on all the aerials and means for utilising the samples for indicating the direction of an incoming signal. Preferably the planes of polarisation of the two sets of aerials are mutually perpendicular though this is not a theoretical necessity. The samples may be taken by distributor switch means, switching each aerial in turn or they may be taken by a radiogoniometer.

Preferably all the aerials are arranged on a single circle of several wavelengths diameter (e.g. three or four wavelengths) centred on the centre point.

In one way of carrying out the invention each aerial is directional, "pointing" in a different direction which is at a predetermined angle (which may be and usually will be zero) to the radius from the centre point to the aerial considered. In one embodiment of this nature each aerial consists of a main element and a reflector element, the aerials of one set being rod elements (i.e. dipoles or unipoles) and those of the other set being loop elements. Alternatively and preferably each aerial of one set consists of a main unipole and a reflector unipole upstanding from an earth plane and each aerial of the other set consists of a main circular slot and a reflector circular slot cut in said earth plane. The samples are taken from each main aerial to a common receiver and the detected output therefrom is phase-compared with a reference wave of the sampling frequency (by which is meant the frequency with which each aerial is sampled) the resulting signal being used to control means indicating the incoming signal direction.

In another way of carrying out the invention each aerial is non-directional; for example, each aerial of one set may consist of a rod element such, for example, as a unipole upstanding from an earth plane and each aerial of the other set may consist of a loop or, where an earth plane is employed, of a circular slot cut in said earth plane. Where non-directional aerials are used direction indication may be obtained by feeding the successive samples to a common receiver, demodulating the signals to obtain a signal whose envelope corresponds to the phase difference between the signals at aerials which are consecutively samples and whose frequency is the sampling frequency, phase-comparing this signal with a reference wave of the same frequency, and using the resulting output to control means indicating the incoming signal direction.

In both these ways of carrying out the invention distributor switch means for sampling each aerial in turn may comprise normally non-conducting diodes inserted in the leads from the aerials to the receiver and pulse generating means adapted and arranged to bias said diodes to the conducting state in the required sequence for the distributive switching.

Figure 2:
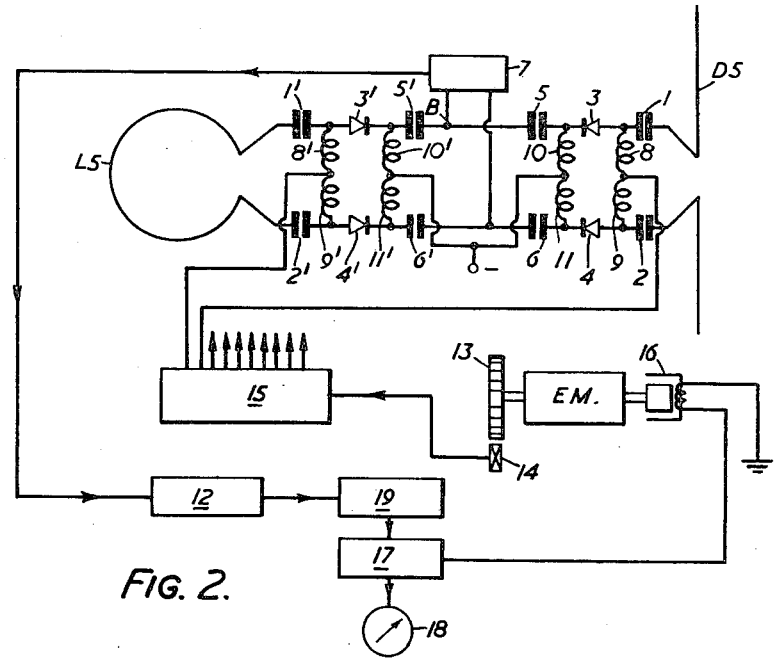
Figure 3:
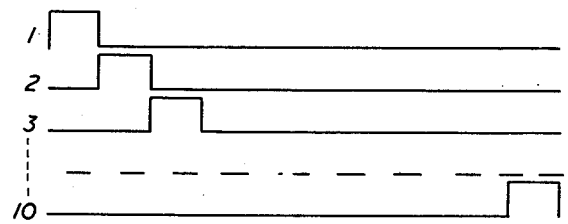
Figure 4:
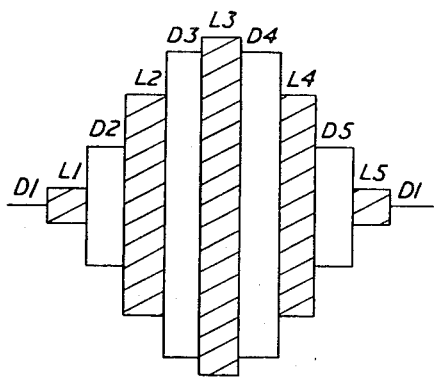
Figure 5:
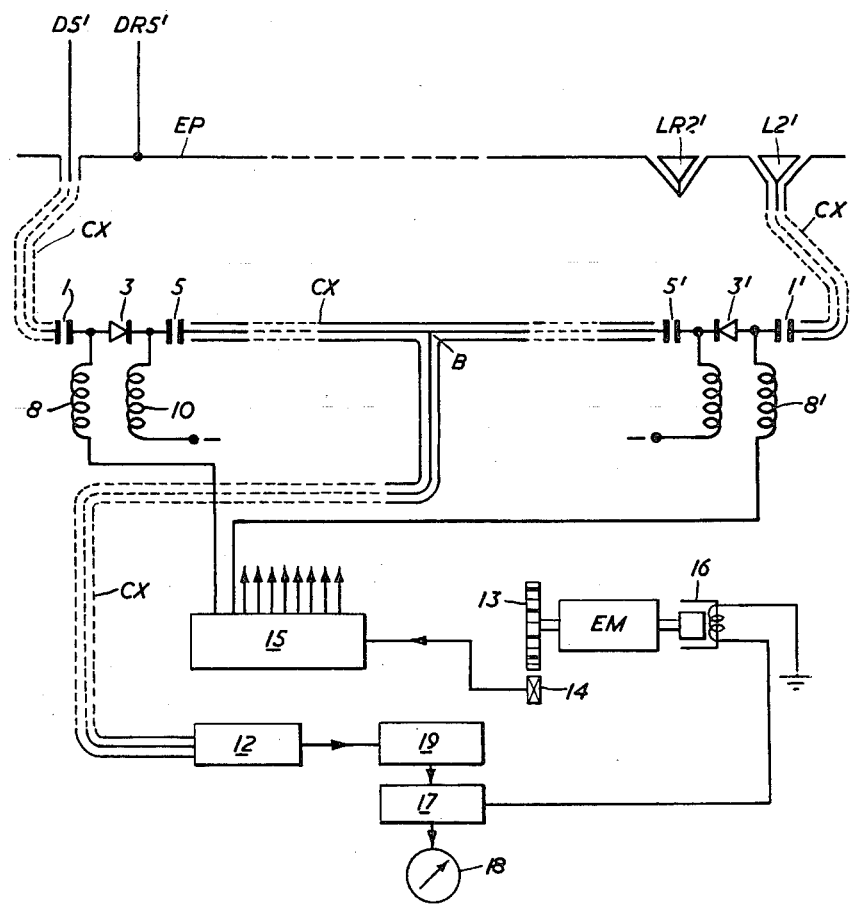

The invention is illustrated in and further explained in connection with the accompanying drawings. In the drawings FIGURE 1 is a schematic representation of one embodiment; FIGURE 2 is a partially schematic partially diagrammatic representation of the aerial connections and switching arrangements; FIGURES 3 and 4 are explanatory graphical figures; and FIGURE 5 illustrates a preferred modification.

Referring to FIGURE 1, D1, DR1—D2, DR2—D3, DR3—D4, DR4—D5, DR5 are pairs of vertical half-wave dipoles arranged at equal intervals round a circle whose diameter is several times the operating wavelength, for example, four times the operating wavelength. D1 to D5 are "live" aerials and DR1 to DR5 are dipoles with no external electrical connection, each adapted to operate as a reflector with respect to the other aerial of the pair. L1, LR1—L2, LR2—L3, LR3—L4, LR4—L5, LR5 are pairs of horizontal loops disposed around the circle at equal distances between consecutive pairs of dipoles. L1 to L5 are "live" aerials and LR1 to LR5 are loops each of which is adapted to act as a reflector with respect to the other aerial of the pair. The aerials of each pair of dipoles and loops are spaced apart by about one quarter of a wavelength.

In FIGURE 1, for convenience in drawing, each reflector is shown alongside, i.e. on a common circle with, its associated main element. This is a possible arrangement though, if it is adopted, care should be taken to ensure that the polar radiation diagram of each aerial (main element and associated reflector) is not adversely affected by the presence of the adjacent aerials. Because of this liability to mutual interference between adjacent aerials with the arrangement actually shown in FIG. 1 the said arrangement is not preferred, the preferred arrangement being that in which the main and reflector elements of any one aerial are on a common radius from the centre of the whole system, the main element being radially outward of the reflector element. The "live" aerials of all the pairs are connected, via diode switches to a common feeder which connects to a receiver (not shown in FIGURE 1). The connection of these aerials is shown for simplicity in drawing as a single lead from each "live" aerial, connected in series with a diode to a common point A from which a connection is taken off to a receiver (not shown in FIGURE 1). The diodes in the aerial leads are rendered conducting in turn by the application of switching potentials, this condition being conventionally indicated at the diode in the lead from aerial D1 to the point A.

In FIGURE 2, which shows in detail the aerial connections and switching arrangement, D5 is one of the "live" dipoles and L2 one of the "live" loops shown in FIGURE 1. For convenience in drawing the loop L2 is shown as though it were vertical though, as already stated, it is actually horizontal. The connection points of the dipole D are connected via condensers 1 and 2 to similar diodes 3 and 4 and thence via condensers 5 and 6 to the points B and C. To the points B and C are also connected the balanced terminals of a balance-to-unbalance transformer 7, whose unbalanced connection is taken to a receiver 12. Between the junction of condenser 1 and diode 3 and the junction of condenser 2 and diode 4 are connected two radio frequency chokes 8 and 9 in series. Between the junction of diode 3 and condenser 5 and the junction of diode 4 and condenser 6 are connected two radio frequency chokes 10 and 11. The function of chokes 8, 9, 10 and 11 is to prevent radio frequency currents from flowing along the switching leads connected to the junctions of the chokes and the function of condensers 1, 2, 5 and 6 is to prevent switching currents from flowing to the dipole D5 and to the balance-to-unbalance transformer 7.

An electric motor EM rotating at 25 revolutions per second carries on its shaft a phonic wheel 13, having ten teeth, and a pick-up coil 14, acting in co-operation with the phonic wheel 13, produces pulses at a rate of 250 per second. These pulses are fed to a ring counter 15, as well known per se, having ten output terminals and which operates in well-known manner so that successive positive going output pulses are produced at each output terminal in turn, the frequency of the pulses appearing at each output being 25 c.p.s. Referring to FIGURE 3, which shows the waveforms developed at the output terminals of the ring counter 15, the waveforms at 1, 2, 3 . . . 10 being those appearing at the 1st, 2nd, 3rd . . . 10th output terminals, it will be seen that the trailing edge of the output pulse from one output terminal occurs substantially in the same time as the leading edge of the pulse from the next output terminal and so on. Although reference has been made here to a ring counter it is to be understood that other devices, well-known per se, may be used to produce the same result. The output terminals of the ring counter 15 are connected in the manner shown in FIGURE 2 to the live aerials D1 to D5 and L1 to L5 of FIGURE 1 in such order that switching pulses are applied to the aerials successively round the ring of aerials. The appropriate output terminal of ring counter 15 is connected to the junction of chokes 8 and 9, and a negative potential is applied to the junction of chokes 10 and 11. When a positive pulse is received at the junction of chokes 8 and 9 the diodes 3 and 4 become conducting and the dipole D is connected to the terminals of transformer 7. When the pulse ceases the diodes are cut-off and the dipole D is disconnected from transformer 7. The leads from the transformer 7 to the diodes 3 and 4 are arranged to be of such length that a high impedance is presented at the input terminals of the transformer 7 at the operating frequency.

The connections of the loop L2 are similar to those of the dipole D5 and it is thought that no further description is necessary. The references given to the components are the same as those given in connection with dipole D5 with a tick suffix.

It is to be understood, although only two aerials are shown in FIGURE 2, that all the "live" aerials D1, D2, D3, D4, D5, L1, L2, L3, L4, and L5 of FIGURE 1 are connected in the same manner as those shown in FIGURE 2 and that the leads from all the aerials are connected to the points B and C of FIGURE 2.

The electric motor Em also carries on a shaft an alternating wave generator 16, comprising a rotor and coil wound stator, to produce a reference wave of a frequency of 25 c.p.s., which is fed as one input to a phase discriminator 17, of a type well known per se. The rectified output from the receiver 12 is fed to a narrow band pass filter 19, with a centre frequency of 25 c.p.s. and the output therefrom is fed as a second input to the phase discriminator 17, which produces an output responsive to the phase difference between the two input signals. This output is fed to a phase indicating device 18 shown as having a dial with a pointer which indicates the phase difference between the two input signals to discriminator 17, and hence is indicative of the direction of arrival of an incoming wave received by the aerial system of FIGURE 1. The description of the units 12, 17 and 18 is only briefly given as the operation of this part of the system is well known. It will be obvious to one skilled in the art that there are many variations of this part of the system that may be used and many refinements that may be made to this part of the system as described.

Consider a wave having its plane of polarisation at an angle of 45° to the vertical arriving at the aerial system as actually shown in FIGURE 1 from the direction indicated by the arrow E. Assuming no mutual interference between nearby aerials it will be seen that each pair of aerials has a polar diagram of substantially cardioide shape, the axes of the polar diagrams being orientated through an angle of 36° relative to one another. When a switching pulse is applied to the aerial D1 substantially no signal will be passed to the receiver as the signal will arrive in the null of the cardioide of aerial pair D1, DR1. This condition is shown at D1 in FIGURE 4, which represents an ideal waveform at the input to the receiver, assuming the dipoles and loops to have equal sensitivities. A switching pulse is now applied to aerial L1 and the small signal developed in the aerial is fed to the receiver. This procedure is continued and when a switching pulse is applied to aerial L3, as the signal is arriving in the direction of the maximum of the cardioide of aerial pair L3, LR3, a maximum signal is passed to the receiver. On switching the further aerials round the ring the receiver input signal decreases. FIGURE 4 shows the waveform applied to the receiver, divided into vertical strips representing the signal received from each aerial pair, the strips representing the signals received from horizontal loop aerials being shaded. It will be seen that this waveform is repeated at the frequency with which the aerials are switched and that its phase is determined by the direction of arrival of the incoming wave. Comparison of the phase of this signal after rectification with a reference wave of constant phase of the same frequency is therefore indicative of the direction of arrival of the incoming wave.

If the incoming wave were purely vertically polarised then the waveform at the receiver input terminals would be that of FIGURE 4 with the shaded portions removed. Similarly if the incoming wave were purely horizontally polarised the received waveform would be that of FIGURE 4 with the unshaded portions removed. In each case there is a fundamental component at the switching frequency and the direction of arrival is still indicated by the phase of this component. From this it will be obvious that if the plane of polarisation of the incoming wave is intermediate between the cases described the same will be true, namely, that a fundamental component at the switching frequency exists, whose phase is indicative of the incoming signal direction.

FIGURE 5 shows, so far as is necessary to an understanding thereof, a modification which is at present preferred. The arrangement of FIGURES 1 and 2 has, from the practical point of view, the defect of using balanced aerials and it is not easy, in practice, to obtain a high degree of balance. The arrangement of FIGURE 5 differs from that of FIGURES 1 and 2 essentially in being unbalanced, using unbalanced aerials. In place of the main element and reflector dipoles D1 to D5 and DR1 to DR5 of FIGURE 1, unipoles standing up from an earth plane EP (a conductive surface of metal sheet or wires) are used and in place of the horizontal loops L1 to L5 and LR1 to LR5 of FIGURE 1, circular slots cut in the earth plane EP are used. The slot aerials L2' and LR2' are as known per se and consist each of a circular hole in the earth plane in which is a concentric disc shaped conductor spaced therefrom. The disc is at the top of a conductive cone extending downward and spaced from a similar, parallel, conductive surface with its upper edge at the hole. In the case of element L2' the two conical surfaces end, as shown, at the inner and outer conductors of the co-axial cable. In the case of element LR2' the two conical surfaces are connected together at the apex. In FIGURE 5 only two unipoles D5' and DR5' (the latter being a reflector) and two circular slots L2' and LR2' (the latter acting as a reflector) appear since only two oppositely disposed aerials are shown in FIGURE 5. It is to be understood, of course, that there is a plurality of oppositely disposed aerials, all the aerials lying in a ring, are employed as in FIGURE 1. Because of the use of unbalanced aerials the rest of the equipment is considerably simplified as compared to FIGURES 1 and 2, the unit 7 of FIGURE 2 being omitted and the circuitry of FIGURE 5 being single sided only. Connection in FIGURE 5 is by co-axial cabling CX. As like references are used for like parts in FIGURES 2 and 5 further description of the latter figure is thought unnecessary.

I claim:

1. A radio direction finder including a first set of aerials of one plane of polarisation, the aerials of this set being angularly spaced round a centre point; a second set of aerials having a plane of polarisation substantially different from that of the first set, the aerials of said second set being also angularly spaced round said centre point and interspersed with the aerials of the first set; means for cyclically and alternately sampling the signals on all the aerials, means for deriving from the sampled signals a wave whose phase is characteristic of the direction of a signal received by the aerials, and phase comparison means fed with the derived wave for indicating incoming signal direction.

2. A direction finder as claimed in claim 1 wherein all the aerials are arranged on a single circle of several wavelengths in diameter and centred on the centre point of the aerial installation.

3. A direction finder as claimed in claim 1 wherein each aerial is directional and "points" in a different direction which is at a pre-determined angle (including zero) to the radius from the centre point of the aerial installation to the aerial considered.

4. A direction finder as claimed in claim 1 wherein the aerials of one set are unipoles upstanding from an earth plane and those of the other are constituted by slots cut in said earth plane.

5. A direction finder as claimed in claim 1 wherein the samples are taken from each main aerial to a common receiver and the detected output therefrom is phase-compared with a reference wave of the sampling frequency the resulting signal being used to control means indicating the incoming signal direction.

6. A direction finder as claimed in claim 1 wherein each aerial is non-directional and direction indication is obtained by feeding the successive samples to a common receiver, demodulating the signals to obtain a signal whose envelope corresponds to the phase difference between the signals at aerials which are consecutively sampled and whose frequency is the sampling frequency, phase-comparing this signal with a reference wave of the same frequency, and using the resulting output to control means indicating the incoming signal direction.

7. A direction finder as claimed in claim 1 wherein each aerial is sampled in turn by distributor switch means comprising normally non-conducting diodes inserted in the leads from the aerials to the receiver and pulse generating means adapted and arranged to bias said diodes to the conducting state in the required sequence for the distributive switching.

References Cited in the file of this patent

UNITED STATES PATENTS

| 2,422,107 | Luck | June 10, 1947 |
| 2,728,910 | Fewings et al. | Dec. 27, 1955 |
| 2,829,365 | Troost et al. | Apr. 1, 1958 |